United States Patent [19]
Cox et al.

[11] Patent Number: 5,208,655
[45] Date of Patent: May 4, 1993

[54] METHOD AND APPARATUS FOR AUTOMATIC DENSITOMETER ALIGNMENT

[75] Inventors: James R. Cox, Richardson; Mark A. Colvin, Mesquite, both of Tex.

[73] Assignee: Graphics Microsystems, Inc., Sunnyvale, Calif.

[21] Appl. No.: 741,748

[22] Filed: Aug. 7, 1991

[51] Int. Cl.$^5$ .............................................. G01B 11/27
[52] U.S. Cl. .................................... 356/400; 356/138; 356/445
[58] Field of Search ............. 356/400, 401, 138, 445, 356/444; 364/559, 525

[56] References Cited

U.S. PATENT DOCUMENTS

| | | | |
|---|---|---|---|
| 4,648,048 | 3/1987 | Dorn et al. | 356/138 |
| 4,660,158 | 2/1987 | Zingher | 364/559 |
| 4,963,028 | 10/1990 | Braun et al. | 356/445 |

OTHER PUBLICATIONS

Sales brochure for Hammamatsu Position-Sensitive Detectors, Oct., 1988.
Sales brochure for UDT 431 X-Y Optical Position Indicator.
Sales brochure for OP-EYE Optical Position Indicator.
Sales brochure for Reticon Image Sensing Products, 1981.
Sales brochure for Cosar Auto Smart Densitometer.
Introduction for Cosar Auto Smart Densitometer.

Primary Examiner—Samuel A. Turner
Attorney, Agent, or Firm—Limbach & Limbach

[57] ABSTRACT

A system and method for automatically establishing the position of a printed sample relative to a densitometer. The sample is placed on a measurement table. A target incorporated with the sample causes a step change in the densitometer output signal when the target is scanned by the densitometer. By analyzing the step change, the location of the target relative to the measurement table is determined. The location of all points on the sample are known relative to the target, thus the location of all points on the sample relative to the measurement table can be determined.

20 Claims, 4 Drawing Sheets

METHOD AND APPARATUS FOR AUTOMATIC DENSITOMETER ALIGNMENT

BACKGROUND OF THE INVENTION

1. Field of the Invention

The present invention relates to the field of densitometry, and more specifically, to a densitometer which automatically aligns itself with a sample to be measured.

2. Description of the Prior Art

A reflection densitometer is a well known optical measurement instrument that is used for quality control in color printing production processes. The most common use of a reflection densitometer is to measure ink on paper to control the printing process, although densitometers are also used to measure photographic prints and other images on various substrates such as paper, plastic and metal, in order to monitor and control the production of the images or to test the production equipment.

Basically, a reflection densitometer directs a beam of light having a known color quality, i.e., a balance of red, green and blue light in conformance with ANSI/ISO standards, at a printed sample. By using a filtration system, the densitometer then measures the amount of light which is reflected from the surface of the sample and generates an output signal which is indicative of the color density of the sample. In practice, it is most common that the densitometer output signal is actually the reflectance of the sample, but a conversion to density is straightforward since density is the inverse logarithm of reflectance. Unless otherwise indicated, it will be assumed herein that a densitometer generates a reflectance signal as its output.

Illumination and measurement systems are referenced to an axis which is perpendicular to the sample. According to accepted standards, the illumination angle is either 45° or 0° degrees, and the measurement angle is then 0° or 45°, respectively. It is then assumed that the light absorbed by the sample is the difference between the incident light and the reflected light. The sample color density can then be calculated according to an accepted logarithmic relationship.

Automatic densitometers, such as the AutoSmart TM Densitometer made by Graphic Microsystems, Inc., have been developed which use a computer to control the position of the densitometer with respect to a measurement table, thus enabling the densitometer to be automatically driven to measure a predefined pattern of measurement points on the printed sample. Using motor driven horizontal and vertical positioning, automatic densitometers can read up to 250 points on a printed sample in less than one minute.

However, it is difficult to place a printed sample sheet in an identical x-y orientation relative to the measurement table every time a sheet is placed on the table for measurement. Thus, the position of each measurement point on a sample sheet may be slightly offset relative to the table for each successive sheet which is measured. This causes a conventional automatic densitometer measurement scheme to take readings at close, but not exact locations. Therefore, it is desirable to have a method of locating the pattern of measurement points with a high degree of accuracy each time a new sheet is put on the table for measurement.

The AutoSmart TM Densitometer requires an operator to manually align an optical target in the densitometer with two or three selected "alignment points" on the printed sample. Once the positions of the three alignment points are known, the locations of all points to be measured can be calculated by the computer.

Some automatic position indicators use auxiliary targets and sensors to locate the targets. For example, the Hammamatsu quadrant detector can be used to locate targets such as light spots. Bar code scanners can be used to sense the widths of target lines. Other more elaborate schemes use "machine vision" techniques that locate targets by using video images. The disadvantage of all of these methods is that they require complex and costly additional equipment, including a light source, a detector, and electronic processing circuitry.

If the task of locating the alignment points could be automated, the measurement of a sample sheet would be easier and faster. Also, the accuracy of locating the measurement points, which was previously limited by the operator's ability to visually position the target on an alignment point, can be improved.

SUMMARY OF THE INVENTION

The present invention provides a system and method for automatically aligning a densitometer relative to a printed sample. The sample is placed on a measurement table to which the densitometer is movably affixed. The densitometer then scans a predefined target on the sample. The densitometer output, i.e., the reflectance, undergoes a step change as the target is scanned. By analyzing the step change in the reflectance signal, the position of an alignment target relative to the table is established. All other points on the sample have a known position relative to the target position. By using two or three alignment points, a predefined pattern of points on the sample can be measured by the densitometer system using the target positions as references.

One advantage of the present invention is that it uses the conventional measurement optics of the densitometer to automatically locate a pattern of points to be measured on a given printed sample. In addition, a novel target can be incorporated into the sample to permit confirmation that the proper target has been correctly located. Preferably, vertical and horizontal edges are scanned to define a target location. Advantageously, different targets may be used for operator location and automatic machine location, but these targets have a known position relative to each other so that the operator targets and the automatic machine targets can satisfy different requirements.

Other features and advantages of the present invention will be more fully understood and appreciated upon consideration of the following detailed description of the invention and accompanying drawings which set forth an illustrative embodiment in which the concepts of the invention are utilized.

DETAILED DESCRIPTION OF THE INVENTION

In describing the present invention, the following definitions will prove helpful:

Measurement Point: the center of a spot to be measured with the densitometer. Its location is defined by the x,y coordinates of the center of the spot.

Measurement Pattern: An array of measurement points each with a known location relative to the other measurement points.

Alignment Point: A point used to define the location of all points in the measurement pattern.

Alignment Target: An image used to locate an alignment point. For example, a crosshair could be used to locate the center of the crosshair as an alignment point; a dot could be used to locate the center of the dot as an alignment point; a corner of a printed rectangle could be used to locate the position of the corner as an alignment point.

NOTE: One of the novel concepts of the present invention is that the alignment point need not be at any particular location with respect to the alignment target. For example, the alignment point could be defined as 0.050" to the left and 0.100" down from the center of a crosshair target, or 0.2" to the left and 0.1" upward from a specified corner of the sample used as an alignment target.

Projected Target: A target that moves with the measurement head of an automatic densitometer and which may be positioned on an alignment target for visually locating the alignment point.

Operator Alignment Target: A target which is easy for the operator to locate by positioning the projected target in alignment with it.

Automatic Alignment Target: A target which is easy to locate automatically.

NOTE: One of the novel concepts of this invention is that the operator alignment target and the automatic alignment target for locating the same alignment point can be different. Therefore each can be optimized to facilitate use of either manual or automatic alignment.

Target feature: A feature of an alignment target such as the edges defining the corner of a rectangle or the lines of a crosshair.

Figure 1:
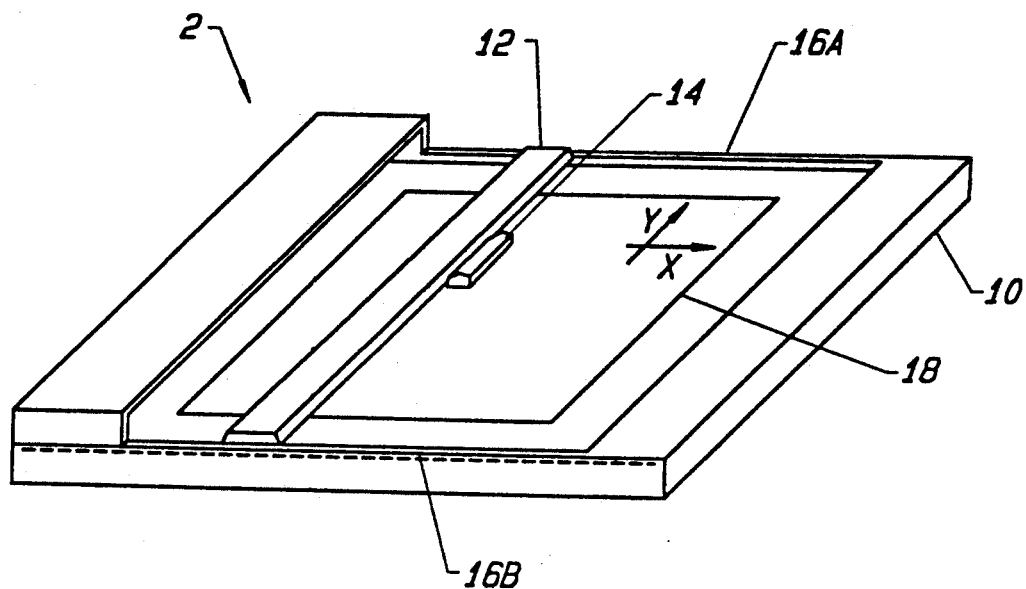
FIG. 1 is a perspective view illustrating a densitometer system in accordance with the present invention.

An automatic densitometer system 2 is illustrated in FIG. 1. The system 2 includes a measurement table 10 that has an arm 12 to which a densitometer head 14 is attached. The arm 12 is movable in the horizontal or x-direction along tracks 16a, 16b on the top and bottom, respectively, of the table 10, and the densitometer head 14 is movable along the arm 12 in the vertical or y-direction. The arm 12 and head 14 are motor driven under control of a conventional personal computer system (not shown), such as an IBM DOS-compatible PC, such that the arm 12 and head 14 can traverse the full layout of the table 10. In this way, the computer can drive the arm 12 and head 14 to any predefined point, preferably referenced as an x,y coordinate, relative to the measurement table 10.

In operation, the operator places a sample sheet 18 of printed material on the table 10. While the present invention is described with reference to a rectangular flat printed sample, it should be recognized that other sample shapes and configurations, for example, a printed two piece can, could be used with equal success by modifying the way in which the sample is held and the way that the densitometer traverses the sample.

Figure 2:
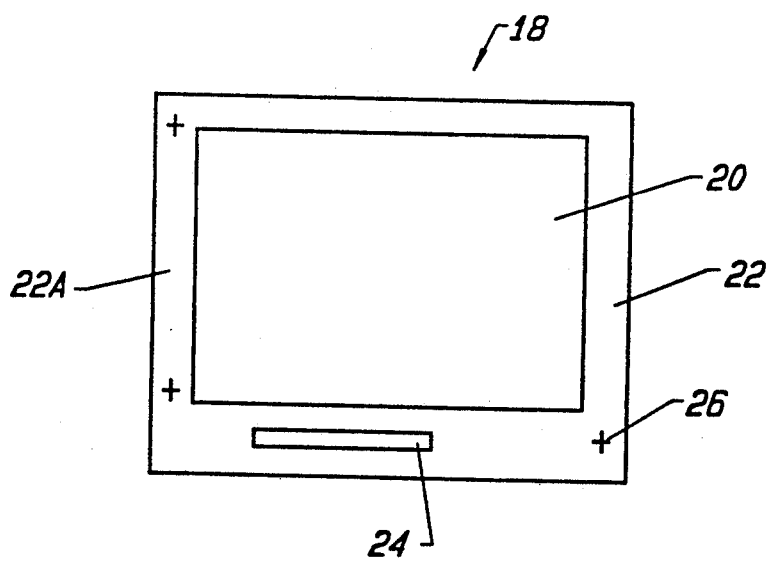
FIG. 2 is a plan view illustrating a typical printed sample.

As illustrated in FIG. 2, a typical printed sheet 18 comprises an unprinted substrate, such as paper, to which a design is applied by coating portions of the substrate with one or more colored inks by a variety of methods, such as lithography. The printed matter 20 is located on the substrate such that it leaves a border or trim area 22 of unprinted substrate around the outside of the printed matter 20 into which a color bar 24 or other reference information such as an alignment target 26 may be provided. The trim area 22 will usually be present on all four sides of the printed matter, and while preferred, it is not required.

As noted above, the illumination and measurement geometry for the densitometer is precisely defined. See, for example, the following standards: ANSI Ph2.17, ISO 5/4, and DIN 16536. Thus, according to industry standards, a circular spot on the sample is uniformly illuminated by a beam of light having a known color quality, and the reflected light is measured by the densitometer in conformance with accepted standards.

The Autosmart ™ Densitometer, described in the Background section above, used automatic scanning of a spot approximately the size of the measurement aperture to determine the precise relative position of the projected target and the center of the measurement spot. The projected target and the measurement spot are separated by two inches, but due to manufacturing tolerances, the relative locations may vary by up to 0.050". By making one x and one y scan across a black spot which the operator manually aligns with the projected target and determining the location of the minimum reflectance signal for each scan, the x and y distance between the center of the projected target and the center of the measurement spot can be measured by the densitometer to within +/− 0.005". This method is not adequate for automatic alignment of sheets, however, because the difference between the estimated position of the target before alignment and the actual position of the target must be very small or the alignment will fail. For example, with a two millimeter (0.080") measurement spot, the difference can only be about +/− 0.050" to provide effective alignment.

According to the present invention, the densitometer head 14 is caused to automatically scan alignment targets 26 prior to making its measurements of the predefined measurement pattern. By establishing the exact position of the alignment targets relative to the measurement table, the position of each predefined measurement point on the sample, previously known relative to the sample, is now known relative to the table.

It is preferred to have three alignment targets 26, since scanning three points can cause the computer to account for movement of the sample by translation, rotation, or stretch. Thus, by locating three targets in a triangular relationship, the correction required by each target can be generally expressed as:

$$X = ax + bx + c \tag{1}$$

$$y = dx + ey + f \tag{2}$$

where X,Y are the true coordinates of target points or measurement points on the sheet, and x,y are the original coordinate of the target points or measurement points when they were initially selected, and a,b,c,d,e,f are constants. The location of the three target points requires simultaneous solution of six equations in six unknowns to find the constants a,b,c,d,e,f. Then all measurement points can be located by reference to the equations. However, in many practical applications, stretch is not really a factor, thus two alignment points would suffice.

Figure 3B:
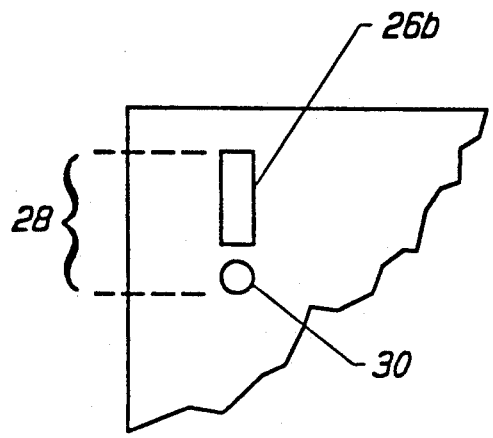
FIGS. 3a and 3b are plan views illustrating the preferred alignment target in accordance with the present invention.
Figure 3A:
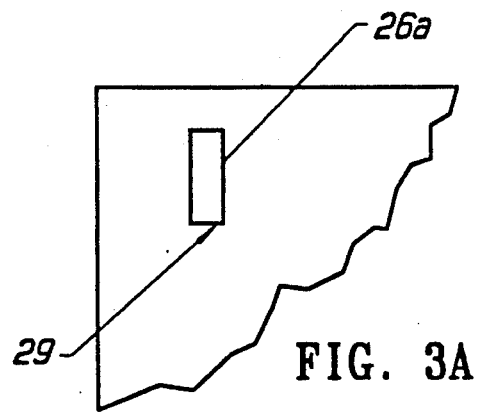

Referring now to FIG. 3a, an example of a preferred alignment target 26a is illustrated. Alignment target 26a provides high reliability and accuracy for both manual and automatic alignment with a shape that can fit in the trim area 22 of most printed sheets. The preferred target features are the vertical or horizontal "edges" of the printed bar 26a, i.e., the boundaries between the printed and unprinted substrate. Typically, the corner 29 of the bar 26a is defined as the alignment point. The alignment target 26a is shown in a vertical orientation, but may also be in a horizontal or any other orientation by using a different scan pattern.

It is an important concept of this invention that by scanning a vertical edge or line in the x direction, the x coordinate of the target can be determined without knowledge of the precise y coordinate. For example, if the vertical edge of target 26a is one-half inch long, it is practical to find the precise edge location if the estimated location is within about +/− one-quarter inch of the true location of the target. Once the x location is known, the edge to be located by the y scan can be much shorter, since the x position of the edge is known.

Figure 4A:
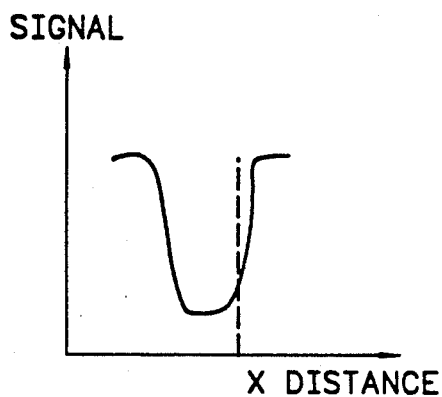
FIGS. 4a–4d are waveforms illustrating the reflectance signal from a densitometer scan of the target of FIG. 3 in accordance with the present invention.
Figure 4B:
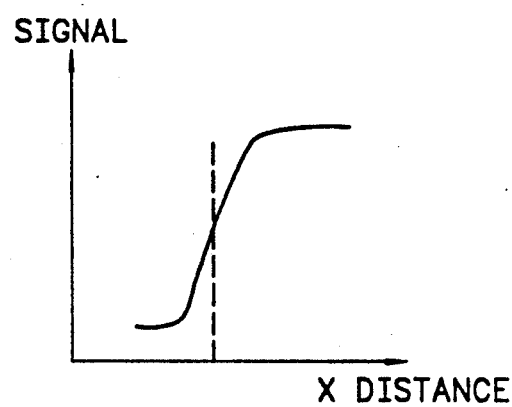
Figure 4C:
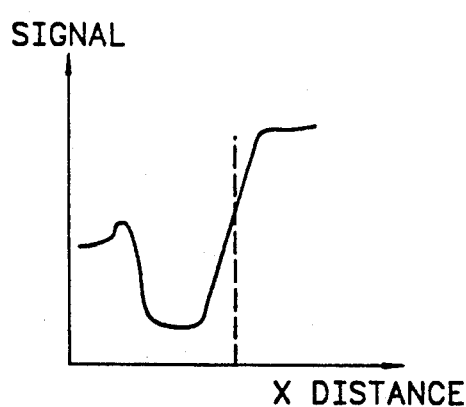

FIGS. 4a–4c show typical densitometer reflectance signals of a left to right scan of the alignment target 26a when it is placed in the left trim area 22a of the sheet 18. In each case, the boundary edge is located at the midpoint of the step change from low to high signal. The smaller transitions and the large transition from high to low signal may or may not be present depending on whether the scan starts to the left of the target but on the paper (FIG. 4a), on the target (FIG. 4b), or to the left of the target on the gray measurement table (FIG. 4c). All of the extraneous transitions are ignored by identifying the large transition from low to high signal and by prior knowledge of the approximate values of the low signal to be expected on the target and the high signal to be expected on the unprinted substrate. The expected signal levels are determined during set up of the measurement pattern.

In a variation of the above, FIG. 3b includes a round dot 30 which may be used to confirm that the correct alignment point has been located.

Figure 4D:
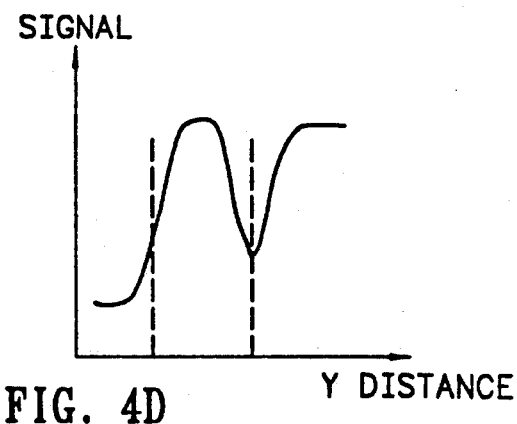
Figure 7A:
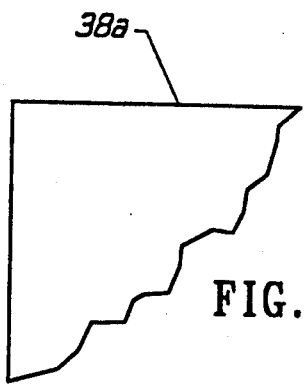
Figure 7C:
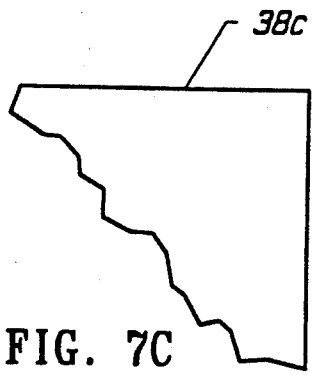
Figure 7B:
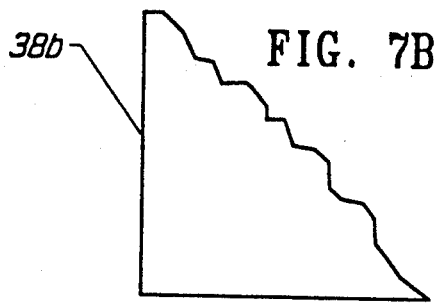
Figure 7D:
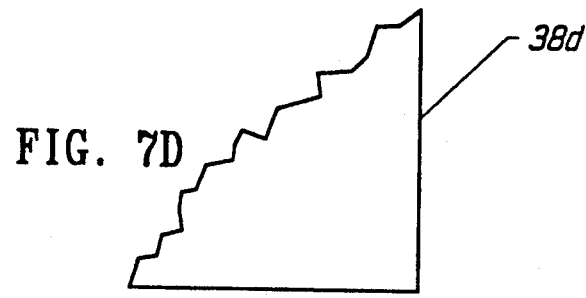
Figure 8A:
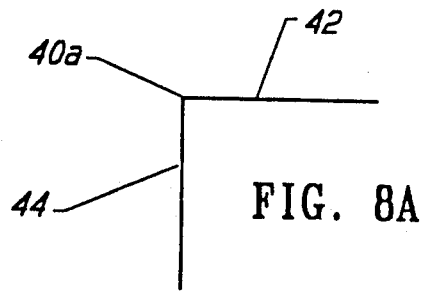
Figure 8C:
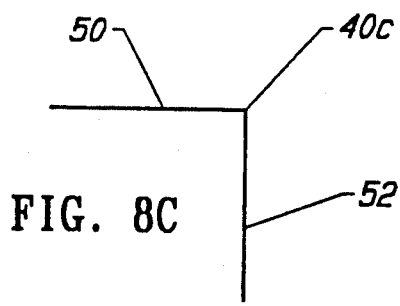
Figure 8B:
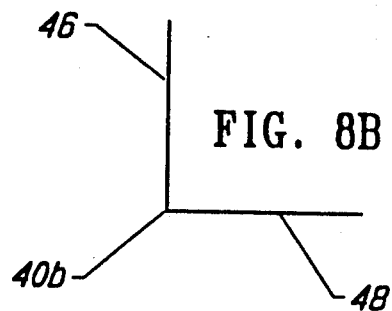
Figure 8D:
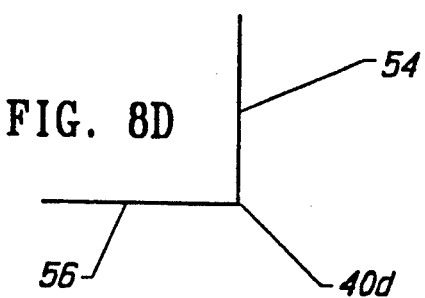

FIG. 4d shows a typical curve of signal as the alignment target 28 of FIG. 3b is scanned downward in the y direction beginning at the center of the target in the x dimension. The center of the target in the x dimension is known from the first scan. The y scan may begin anywhere in the y dimension of the target depending on the relationship of the estimated position of the alignment point and the actual alignment point. The y dimension of the bottom horizontal edge of the target is located at the midpoint of the first large transition from low signal to high signal.

The second valley in FIG. 4d following the transition which located the bottom edge of the target is caused by scanning the dot 30. The second valley, by its location and depth, can be used to confirm that the proper alignment target location was found and is a measure of the degree of accuracy of the location.

Figure 5:
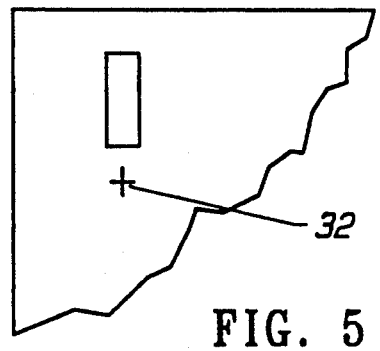
FIGS. 5, 6a, 7a–7d, 8a–8d, and 9 illustrate alternative alignment targets in accordance with the present invention.

Other target examples are shown in FIGS. 5–9. In FIG. 5, a crosshair 32 is used for the operator alignment target instead of spot 30. The crosshair 32 is a good target for operator alignment, but does not provide the verification of automatic alignment that the dot provides.

Figure 6A:
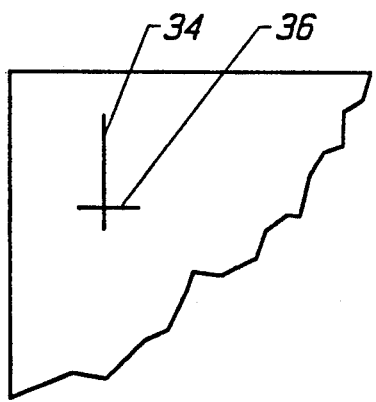
Figure 6B:
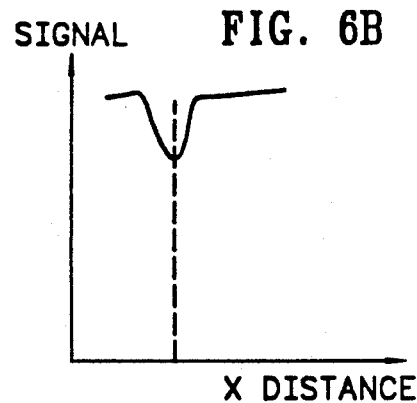
FIG. 6b is a waveform illustrating the reflectance signal from a densitometer scan of the target of FIG. 6a in accordance with the present invention.

In FIG. 6a, the intersection of lines 34, 36 is the operator alignment target. Lines 34, 36 are also the automatic alignment target. FIG. 6b shows the output signal for an x scan of a line 34. The transition is not as large as that for bar 28, thus, is not as immune to detection of false targets.

In FIGS. 7a–7d, any one of the four corners 38a, 38b 38c, 38d. Of a printed region 20 of a sample 18 could be selected as the operator alignment target. The computer uses the two edges associated with the corner to locate the x,y coordinates of the corner. Corners are less desirable for operator alignment targets, and are not as reliable for automatic alignment, but they do have the advantage that they are already present in many printed sheets.

In FIGS. 8a–8d, the corners 40a, 40b, 40c, 40d are created by lines 42 and 44, 46 and 48, 50 and 52, 54 and 56, respectively. A corner is selected as the operator alignment target and the lines are used by the machine to locate the target. These types of corners are better for operator alignment, but not as effective for automatic alignment as the solid corners.

Figure 9:
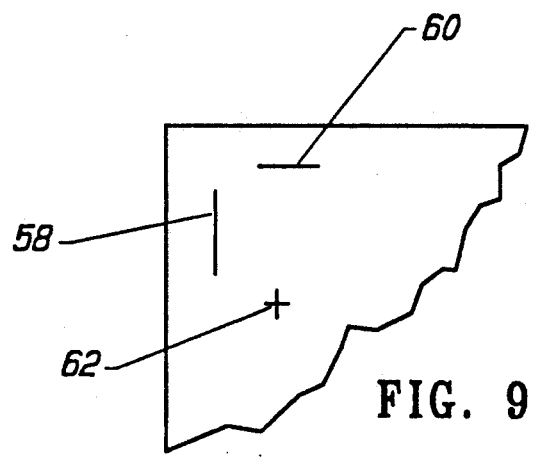

FIG. 9 is an example to show that the horizontal edge 60 and the vertical edge 58 used by the machine do not need to be in any special arrangement with respect to each other, or with respect to the operator target 62. The only requirement is that these targets be in a known relative position with respect to each other.

It should be understood that the present invention is not intended to be limited by the specifics of the above-described embodiments. The scope of the invention is defined by the accompanying claims.

We claim:

1. A method for aligning an automatic reflectometer relative to a printed sample which is to be measured by the reflectometer, wherein the sample has at least one alignment target and a plurality of features printed thereon, and wherein each feature has a known position relative to the target, comprising:

a. placing the sample on a sample holder;
 b. scanning the alignment target with the reflectometer to generate an output signal from the reflectometer that undergoes a step change as the target is scanned such that the position of the target relative to the sample holder is established by reference to the step change, thereby establishing the position of each feature relative to the sample holder, wherein the scanning step comprises:
 c. making a horizontal (x-dimension) scan across the target to obtain a first signal, wherein the step change in the first signal establishes the horizontal position (x-coordinate) of the target relative to the sample holder; and
 d. making a vertical (y-dimension) scan across the target to obtain a second signal, wherein the step change in the second signal establishes the vertical position (y-coordinate) of the target relative to the sample holder.

2. The method of claim 1, wherein the alignment target includes a long edge and a short edge, and wherein the scanning step comprises:
   a. making a scan across the long edge of the target to obtain a first signal, wherein the step change in the first signal establishes a first coordinate of the target relative to the sample holder; and
   b. making a scan across the short edge of the target to obtain a second signal, wherein the step change in the second signal establishes a second coordinate of the target relative to the sample holder.

3. A method for aligning an automatic reflectometer relative to a printed sample which is to be measured by the densitometer, wherein the sample has a first and a second alignment target and a plurality of features printed thereon, and wherein each feature has a known position relative to the first and second targets, comprising:
   a. placing the sample on a sample holder;
   b. scanning each of the first and second targets with the reflectometer to generate a corresponding output signal from the reflectometer that undergoes a step change as each target is scanned such that the position of each target relative to the sample holder is established by reference to the corresponding step change, thereby establishing the position of each feature relative to the sample holder, wherein the relative positions of the first and second targets indicate any translations or rotational shift in the sample relative to the sample holder, said scanning step comprising:
      i. making a horizontal (x-dimension) scan across the first target to obtain a first signal, wherein the step change in the first signal establishes the horizontal position (x-coordinate) of the first target relative to the sample holder;
      ii. making a vertical (y-dimension) scan across the first target to obtain a second signal, wherein the step change in the second signal establishes the vertical position (y-coordinate) of the first target relative to the sample holder;
      iii. making a horizontal (x-dimension) scan across the second target to obtain a third signal, wherein the step change in the third signal establishes the horizontal position (x-coordinate) of the second target relative to the sample holder; and
      iv. making a vertical (y-dimension) scan across the second target to obtain a fourth signal, wherein the step change in the fourth signal establishes the vertical position (y-coordinate) of the second target relative to the sample holder.

4. The method of claim 3, wherein the sample further includes a third alignment target, wherein the relative positions of the first, second and third targets establish whether the sample has undergone any translational movement, rotational movement, or stretch, and wherein the scanning step further comprises:
   i. making a horizontal (x-dimension) scan across the third target to obtain a fifth signal, wherein the step change in the fifth signal establishes the horizontal position (x-coordinate) of the third target relative to the sample holder; and
   ii. making a vertical (y-dimension) scan across the third target to obtain a sixth signal, wherein the step change in the sixth signal establishes the vertical position (y-coordinate) of the third target relative to the sample holder.

5. A method for aligning an automatic reflectometer relative to a printed sample which is to be measured by the reflectometer wherein the sample comprises a substrate having a region of printed matter thereon and a border between the printed matter and a sample holder, and wherein the reflectometer is movably affixed to the sample holder and takes optical measurements of the sample at a plurality of points on the sample, each point having a known position relative to the other points, comprising;
   a. incorporating at least two predefined alignment targets into the border area, said targets having a known position relative to each point on the sample; and
   b. scanning each of the alignment targets with the reflectometer to generate a corresponding output signal from the reflectometer that undergoes a step change as the reflectometer scans each target, such that the position of each target relative to the sample holder is established by reference to the step change, thereby establishing the position of each point on the sample relative to the sample holder.

6. The method of claim 5, wherein each of the predefined alignment targets includes a long edge and a short edge, and wherein the scanning step comprises:
   a. making a scan across the long edge of the first alignment target to obtain a first signal, wherein the step change in the first signal establishes a first coordinate of the first target relative to the sample holder;
   b. making a scan across the short edge of the first alignment target to obtain a second signal, wherein the step change in the second signal establishes a second coordinate of the first target relative to the sample holder;
   c. making a scan across the long edge of the second alignment target to obtain a third signal, wherein the step change in the third signal establishes a first coordinate of the second target relative to the sample holder; and
   d. making a scan across the short edge of the second alignment target to obtain a fourth signal, wherein the step change in the fourth signal establishes a second coordinate of the second target relative to the sample holder.

7. A method for aligning an automatic reflectometer relative to a printed sample which is to be measured by the reflectometer, wherein the sample comprises substrate having a region of printed matter thereon and a border between the printed matter and a sample holder, and wherein the reflectometer is movably affixed to the sample holder and takes optical measurements of the sample at a plurality of points on the sample, each point having a known location relative to the other points, comprising:
   a. scanning across the border with the densitometer in the x-direction to obtain a first signal, wherein the first signal exhibits a low state when the printed matter is scanned, and wherein the first signal exhibits a high state when the border or sample holder is scanned, such that the x-position of the edge between the printed matter and the border is defined as the midpoint of the transition of the first output signal from low to high; and
   b. scanning across the border with the densitometer in the y-direction to obtain a second signal, wherein the second signal exhibits a low state when the printed matter is scanned, and wherein the second signal exhibits a high state when the border or sample holder is scanned, such that the y-position of the edge between the printed matter and the border can be defined as the midpoint of the transition of the second signal from low to high.

8. An automatic reflectometer system for automatically measuring the color quality of a sample of printed material at a plurality of predefined measurement points on the sample, wherein the sample comprises a substrate having at least one color component applied thereto, comprising:
   a. holding means for holding the sample;
   b. traversing means movably attached to the holding means for traversing the sample;
   c. a reflectometer coupled to the traversing means for generating an output signal proportional to the reflectance of the color component at a selected measurement point;
   d. controlling means coupled to the traversing means for controlling the position of the traversing means and of the reflectometer relative to the holding means; and
   e. reference means affixed to the sample for providing a reference to the controlling means such that the position of each measurement point is established relative to the holding means;
   wherein scanning said reference means with the densitometer causes the output signal to undergo a step change, and wherein the position of the step change relative to the holding means is determined by the controlling means so as to establish the position of the reference means relative to the holding means, thereby establishing the position of each measurement point relative to the holding means, such that the controlling means can drive the traversing means and densitometer to each of the measurement points.

9. The densitometer system of claim 8, wherein the sample includes a printed area where the color components are applied, and a border area between the printed area and the holding means.

10. The reflectometer system of claim 8, wherein the reference means comprises an edge of the color component.

11. The reflectometer system of claim 9, wherein the reference means comprises a rectangular shape in the border area, said shape having a color component applied thereto.

12. The reflectometer system of claim 9, wherein the reference means comprises a pair of perpendicular lines in the border area.

13. The reflectometer system of claim 12, wherein the lines intersect.

14. A method for automatically measuring the color quality of a plurality of printed samples, wherein each sample has a predefined pattern of measurement points, and wherein a color quality measurement will be made at each of the measurement points by a reflectometer, and wherein the densitometer is movably affixed to a sample holder, comprising:
   a. incorporating at least two alignment targets onto each printed sample, said targets having a known position relative to the pattern of measurement points;
   b. placing a selected sample on the sample holder;
   c. scanning the targets with the reflectometer to generate an output signal from the reflectometer that undergoes a step change as each target is scanned, such that the position of each target relative to the sample holder is established by reference to the step change, thereby establishing the position of each of the measurement points relative to the sample holder;
   d. driving the reflectometer to each of the measurement points and taking a color measurement; and
   e. repeating steps b through d as necessary.

15. The method of claim 1, wherein the reflectometer is a reflection densitometer.

16. The method of claim 3, wherein the reflectometer is a reflection densitometer.

17. The method of claim 5, wherein the reflectometer is a reflection densitometer.

18. The method of claim 7, wherein the reflectometer is a reflection densitometer.

19. The automatic densitometer system of claim 8, wherein the reflectometer is a reflection densitometer.

20. The method of claim 14, wherein the reflectometer is a reflection densitometer.

* * * * *